United States Patent
Asakura et al.

(10) Patent No.: US 10,234,004 B2
(45) Date of Patent: Mar. 19, 2019

(54) BALL SCREW DEVICE AND STEERING SYSTEM

(71) Applicant: JTEKT CORPORATION, Osaka-shi, Osaka (JP)

(72) Inventors: Toshihiro Asakura, Chiryu (JP);
Takuya Nakayama, Okazaki (JP);
Keisuke Ogawa, Toyota (JP)

(73) Assignee: JTEKT CORPORATION, Osaka (JP)

( * ) Notice: Subject to any disclaimer, the term of this patent is extended or adjusted under 35 U.S.C. 154(b) by 44 days.

(21) Appl. No.: 15/602,288

(22) Filed: May 23, 2017

(65) Prior Publication Data

US 2017/0343088 A1    Nov. 30, 2017

(30) Foreign Application Priority Data

May 30, 2016   (JP) ................................ 2016-107443

(51) Int. Cl.
| | |
|---|---|
| *F16H 25/22* | (2006.01) |
| *B62D 3/08* | (2006.01) |
| *B62D 5/04* | (2006.01) |
| *F16H 25/20* | (2006.01) |

(52) U.S. Cl.
CPC .......... *F16H 25/2233* (2013.01); *B62D 3/08* (2013.01); *B62D 5/0424* (2013.01); *B62D 5/0448* (2013.01); *F16H 2025/2081* (2013.01); *F16H 2025/2096* (2013.01)

(58) Field of Classification Search
CPC .............................. F16H 25/2233; B62D 3/08
USPC ........................................................ 180/444
See application file for complete search history.

(56) References Cited

U.S. PATENT DOCUMENTS

| | | | | |
|---|---|---|---|---|
| 2,718,165 A | * | 9/1955 | Bourassa | ................ B25B 1/103 269/241 |
| 2,739,491 A | * | 3/1956 | Russell | ............... F16H 25/2233 74/424.9 |
| 3,489,055 A | * | 1/1970 | Erwin | ................. F16H 25/2233 285/390 |

(Continued)

FOREIGN PATENT DOCUMENTS

| | | | |
|---|---|---|---|
| DE | 102010036710 A1 * | 6/2011 | .......... F16C 33/3825 |
| FR | 2 690 956 A1 | 11/1993 | |

(Continued)

OTHER PUBLICATIONS

Oct. 30, 2017 European Search Report issued in European Patent Application No. 17173086.4.

*Primary Examiner* — Joseph M Rocca
*Assistant Examiner* — Conan D Duda
(74) *Attorney, Agent, or Firm* — Oliff PLC (57) ABSTRACT

A ball screw device and a steering system that include a retainer having more uniform stiffness are provided. Between a rack shaft and a ball screw nut, a cylindrical retainer having a plurality of retainer grooves that retain balls in a rollable manner is provided. Each retainer groove has two short inner surfaces that intersect the extending direction of the retainer groove and two long inner surfaces that intersect these short inner surfaces and extend along the extending direction of the retainer groove. In each of interior-angle portions where the short inner surfaces and the long inner surfaces intersect, a corner round surface is formed. The radius of the corner round surface is set to be smaller than one half of the width of the retainer groove.

6 Claims, 5 Drawing Sheets

(56) References Cited

U.S. PATENT DOCUMENTS

| | | | |
|---|---|---|---|
| 8,671,789 B2* | 3/2014 | Osterlaenger | F16H 25/2233 |
| | | | 188/72.8 |
| 2009/0255752 A1* | 10/2009 | Asakura | F16H 25/2233 |
| | | | 180/444 |
| 2009/0282940 A1* | 11/2009 | Fujii | F16H 25/2233 |
| | | | 74/424.9 |
| 2010/0050802 A1* | 3/2010 | Chen | F16H 25/2214 |
| | | | 74/424.88 |
| 2011/0120247 A1 | 5/2011 | Osterlaenger et al. | |
| 2014/0224052 A1* | 8/2014 | Chen | F16H 25/2214 |
| | | | 74/424.86 |
| 2017/0334479 A1* | 11/2017 | Asakura | B62D 5/0424 |
| 2018/0017147 A1* | 1/2018 | Kreutzer | F16H 25/2233 |

FOREIGN PATENT DOCUMENTS

| | | |
|---|---|---|
| JP | 2002 323108 A | 11/2002 |
| JP | 2009-257369 A | 11/2009 |

* cited by examiner

BALL SCREW DEVICE AND STEERING SYSTEM

INCORPORATION BY REFERENCE

The disclosure of Japanese Patent Application No. 2016-107443 filed on May. 30, 2016 including the specification, drawings and abstract, is incorporated herein by reference in its entirety.

BACKGROUND OF THE INVENTION

1. Field of the Invention

The present invention relates to a ball screw device and a steering system.

2. Description of the Related Art

As a conventional electric power steering system (EPS), an EPS is known that uses a ball screw device to convert rotational torque of a motor into a linear motion of a rack shaft, thereby assisting a driver in steering operation.

In such a ball screw device, a ball screw nut that is rotated by a motor is screwed onto a rack shaft via balls. In conjunction with rotation of the ball screw nut, the balls roll while rotating in the same direction between the ball screw nut and the rack shaft. If adjacent balls come into contact with each other during rolling of the balls, sliding resistance is generated between the adjacent balls, which causes the rotational torque of the ball screw device to fluctuate. In view of this, a ball screw device of a steering system described in Japanese Patent Application Publication No. 2009-257369 (JP 2009-257369 A) is provided with a retainer (cage) having retainer grooves that retain balls in a rollable manner in order to prevent adjacent balls from coming into contact with each other. Between adjacent balls in the circumferential direction, separating portions each of which is a portion between adjacent retainer grooves of the retainer are provided, whereby the adjacent balls in the circumferential direction are prevented from coming into contact with each other.

In the retainer of JP 2009-257369 A, the stiffness (deflection stiffness in particular) of each separating portion varies with the position in the axial direction. In other words, the stiffness of both end portions of the separating portion in the axial direction is higher than the stiffness of a central portion that is positioned between both end portions of the separating portion.

In this regard, while the stiffness of each separating portion is preferably low from the viewpoint of easy insertion when the balls are inserted between the retainer and the nut, the stiffness of the separating portion is preferably high in order for the retainer to properly retain the balls. However, when the stiffness of the central portion of each separating portion is suitable, the stiffness of the separating portion is high in the end portions, which makes the insertion of the balls difficult. When the stiffness of the end portions of the separating portion is suitable, the stiffness of the separating portion is low in the central portion, and thus the balls may fail to be properly retained and may fall off. When the clearance between the balls and the retainer is reduced so as to prevent the balls from falling off, a situation may occur in which the balls roll while being caught by separating portions more strongly at the end portions of the separating portions than at the central portions of the separating portions due to dimensional variation of the separating portions. This may increase the friction between the balls and the retainer. Thus, a retainer is desired that has separating portions having more uniform stiffness in which the difference between the stiffness of end portions of each separating portion and the stiffness of a central portion of the separating portion is small.

SUMMARY OF THE INVENTION

An object of the present invention is to provide a ball screw device and a steering system that include a retainer having more uniform stiffness.

A ball screw device according to one aspect of the present invention includes: a ball screw shaft having an outer peripheral surface on which a ball rolling groove is spirally formed; a ball screw nut having an inner peripheral surface on which a ball rolling groove is spirally formed; a plurality of balls provided between the ball rolling groove of the ball screw shaft and the ball rolling groove of the ball screw nut; and a retainer disposed between the ball screw shaft and the ball screw nut and having a cylindrical shape in which a plurality of retainer grooves that retain the balls in a rollable manner and a plurality of separating portions each of which is a portion between the retainer grooves adjacent to each other in a circumferential direction and separates the balls from each other in the circumferential direction. The retainer has at least one structure of a structure A in which both end portions of each retainer groove in an extending direction of the retainer groove has a shape that extends more outward than a circular-arc surface shape in a direction orthogonal to the extending direction, a structure B in which a central portion positioned between both base portions that are both end portions of each separating portion in the extending direction of the retainer groove has a length longer in at least one of a radial direction and a circumferential direction of the retainer than that of the base portions, and a structure C in which a groove is formed in a portion other than the central portion of each separating portion in the retainer.

With this configuration, the retainer has at least one of the structures A to C, which increases the stiffness of the central portion, or reduces the stiffness of the base portions, and thus the difference between the stiffness of the central portion and the stiffness of the base portions can be reduced. Consequently, the stiffness can be made more uniform over the respective portions of the retainer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
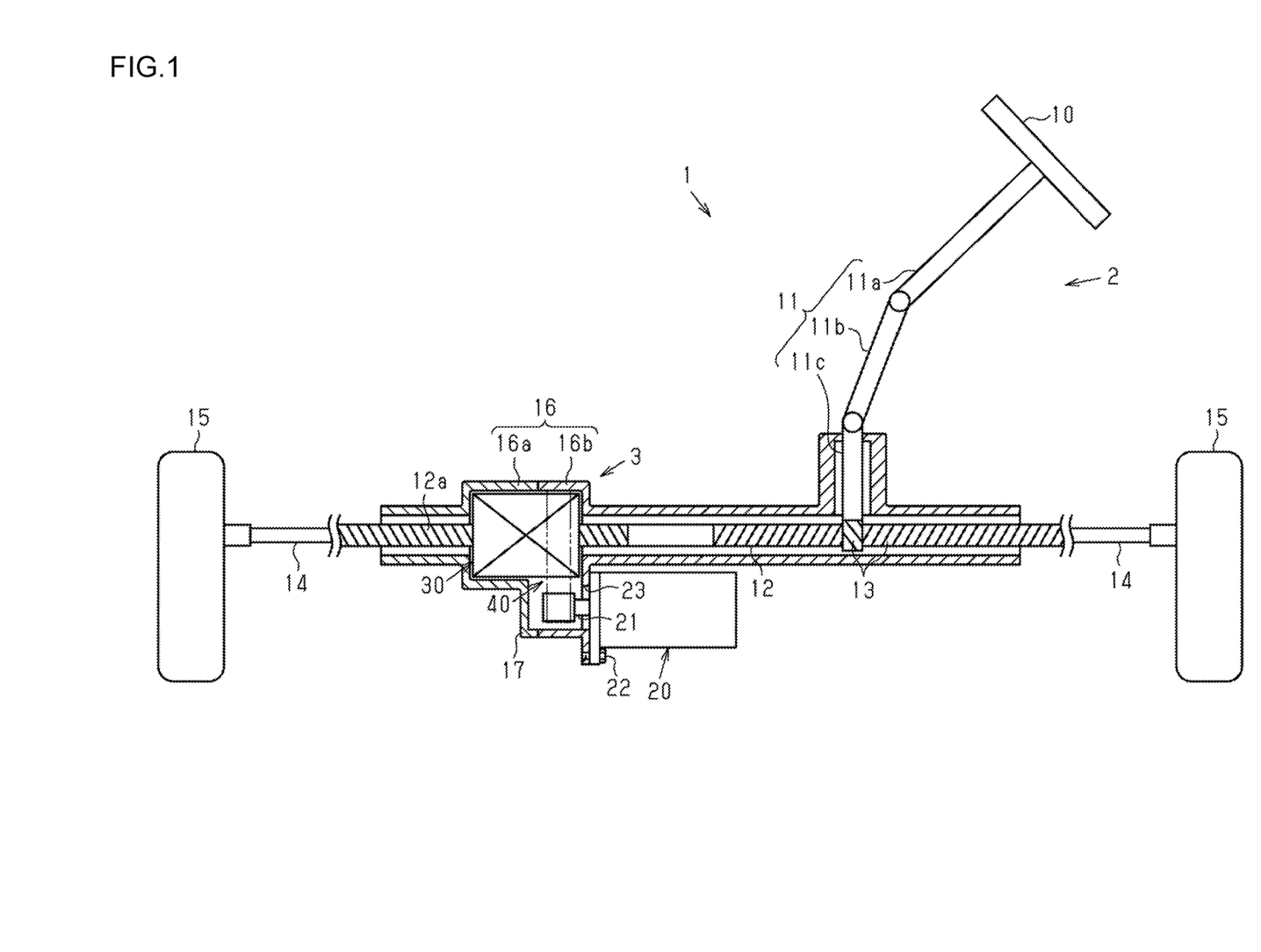
FIG. 1 is a configuration diagram illustrating a schematic configuration of a steering system according to a first embodiment.

A steering system using a ball screw device according to a first embodiment of the present invention will now be described. As depicted in FIG. 1, an electric power steering system (EPS) 1 includes a steering mechanism 2 that steers steered wheels 15 in response to driver's operation of a steering wheel 10 and an assist mechanism 3 that assists a driver in steering operation.

The steering mechanism 2 includes a steering wheel 10 and a steering shaft 11 that rotates integrally with the steering wheel 10. The steering shaft 11 includes a column shaft 11a coupled to the steering wheel 10, an intermediate shaft 11b coupled to a lower-end portion of the column shaft 11a, and a pinion shaft 11c coupled to a lower-end portion of the intermediate shaft 11b. A lower-end portion of the pinion shaft 11c is coupled to a rack shaft 12 that is a ball screw shaft via a rack-and-pinion mechanism 13. The lower-end portion (pinion teeth) of the pinion shaft 11c meshes with the rack shaft 12 (rack teeth). Thus, rotational motion of the steering shaft 11 is converted into reciprocating linear motion of the rack shaft 12 in an axial direction (lateral direction in FIG. 1) via the rack-and-pinion mechanism 13 including the pinion teeth formed on the distal end of the pinion shaft 11c and the rack teeth formed on the rack shaft 12. This reciprocating linear motion is transmitted to the right and left steered wheels 15 via tie rods 14 that are each coupled to both ends of the rack shaft 12, whereby the steered angle of the steered wheels 15 is changed.

The assist mechanism 3 is provided around the rack shaft 12. The assist mechanism 3 includes a motor 20 that is a source of generating assist force, a ball screw device 30 integrally attached around the rack shaft 12, and a speed reducer 40 that transmits rotational force of a rotary shaft 21 of the motor 20 to the ball screw device 30. The assist mechanism 3 converts the rotational force of the rotary shaft 21 of the motor 20 into force of the rack shaft 12 in the axial direction via the speed reducer 40 and the ball screw device 30, thereby assisting the driver in steering operation.

The ball screw device 30, the speed reducer 40, the pinion shaft 11c, and the rack shaft 12 are covered by a rack housing 16. The rack housing 16 is divided near the assist mechanism 3 in the axial direction of the rack shaft 12 into a first rack housing 16a and a second rack housing 16b, and includes these housings coupled to each other. The rack housing 16 includes a speed-reducer housing 17 that is provided so as to protrude in a direction (downward in FIG. 1) intersecting the extending direction of the rack shaft 12. In the speed-reducer housing 17, a part of the speed reducer 40 is housed. In a wall of the speed-reducer housing 17, a through hole 23 is formed. The rotary shaft 21 of the motor 20 extends to the inside of the speed-reducer housing 17 through the through hole 23 formed in the speed-reducer housing 17. The motor 20 is fixed to the speed-reducer housing 17 with a bolt 22 such that the rotary shaft 21 is positioned parallel to the rack shaft 12.

Figure 2:
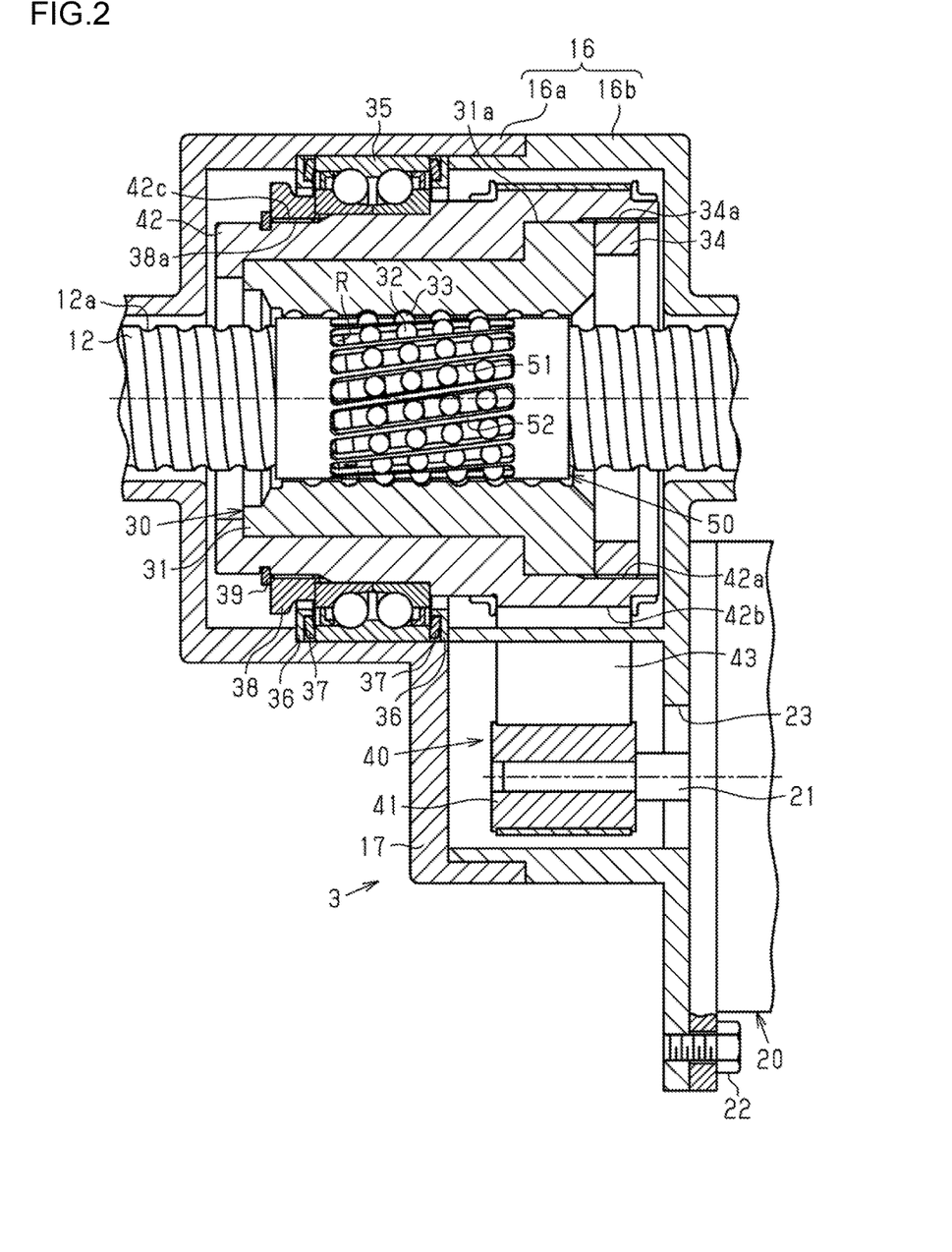
FIG. 2 is a sectional view illustrating a schematic structure of an assist mechanism in the steering system according to the first embodiment.

The following describes the assist mechanism 3 in detail. As depicted in FIG. 2, the ball screw device 30 includes a cylindrical ball screw nut 31 that is screwed to the rack shaft 12 via a plurality of balls 32. The speed reducer 40 includes a drive pulley 41 integrally attached to the rotary shaft 21 of the motor 20, a driven pulley 42 integrally attached to the outer periphery of the ball screw nut 31, and a belt 43 wound between the drive pulley 41 and the driven pulley 42. On the outer peripheral surface of a first end portion (right end of the ball screw nut 31 in FIG. 2) of the ball screw nut 31, a flange portion 31a is formed over the entire area in the circumferential direction. The flange portion 31a is sandwiched between a cylindrical lock screw 34 and a step portion of the driven pulley 42, whereby the ball screw nut 31 is attached to the driven pulley 42 in an integrally rotatable manner. A thread groove 34a formed on the outer peripheral surface of the lock screw 34 and a thread groove 42a formed on the driven pulley 42 are screwed together, and the lock screw 34 accordingly moves in the axial direction. Thus, the lock screw 34 is screwed toward the step portion of the driven pulley 42, so that the flange portion 31a is sandwiched between the lock screw 34 and the driven pulley 42. On an outer peripheral surface of the driven pulley 42, a bearing 35 is provided that supports the driven pulley 42 and the ball screw nut 31 rotatably with respect to an inner peripheral surface of the rack housing 16. As the belt 43, for example, a rubber toothed belt (helically toothed belt) including a core wire is used.

On an outer peripheral surface of the rack shaft 12, a spiral thread groove 12a is formed. On an inner peripheral surface of the ball screw nut 31, a spiral thread groove 33 corresponding to the thread groove 12a of the rack shaft 12 is formed. A spiral space surrounded by the thread groove 33 of the ball screw nut 31 and the thread groove 12a of the rack shaft 12 functions as a rolling passage R in which the balls 32 roll. Although not depicted, in the ball screw nut 31, a circulation passage is formed that is open to two points in the rolling passage R and serves as a shortcut connecting the two points. Thus, the balls 32 can endlessly circulate through the rolling passage R via the circulation passage in the ball screw nut 31. As the circulation passage, that of a deflector type allowing circulation for each row, for example, is used.

The bearing 35 is supported so as to be movable in the axial direction with respect to the rack housing 16. On axially both sides of the outer ring of the bearing 35, annular plates 36 each having an L-shaped cross-section are provided, and a disc spring 37 is provided between each plate 36 and the outer ring of the bearing 35. The inner ring of the bearing 35 is sandwiched between a step portion of a flange portion 42b of the driven pulley 42 in the axial direction and an annular fixing member 38. On an outer peripheral surface of the driven pulley 42 in an area where the flange portion 42b is not formed (specifically, in a certain range of the surface from a second end portion (left end of the driven pulley 42 in FIG. 2) toward a first end portion (right end of the driven pulley 42 in FIG. 2) of the driven pulley 42), a thread groove 42c is formed. On the inner peripheral surface of the fixing member 38, a thread groove 38a is formed that is screwed onto the thread groove 42c formed on the outer peripheral surface of the driven pulley 42.

The thread groove 42c formed on the outer peripheral surface of the driven pulley 42 and the thread groove 38a formed on the inner peripheral surface of the fixing member 38 are screwed together, whereby the fixing member 38 is attached to the driven pulley 42. When the bearing 35 is sandwiched by the step portion and the fixing member 38, a snap ring 39 is fitted onto the driven pulley 42, whereby the fixing member 38 is prevented from moving in the axial direction with respect to the driven pulley 42. By these components, the bearing 35 is supported so as to be swingable in the axial direction with respect to the rack housing 16.

In the assist mechanism 3 thus configured, when the rotary shaft 21 of the motor 20 rotates, the drive pulley 41 rotates integrally with the rotary shaft 21. Rotation of the drive pulley 41 is transmitted to the driven pulley 42 via the belt 43, whereby the driven pulley 42 is rotated. Thus, the ball screw nut 31 that is integrally attached to the driven pulley 42 also rotates integrally. Because the ball screw nut 31 rotates relative to the rack shaft 12, the balls 32 interposed between the ball screw nut 31 and the rack shaft 12 endlessly circulate through the rolling passage R while being loaded from both sides. The balls 32 roll in the rolling passage R, whereby the rotational torque applied to the ball screw nut 31 is converted into force that is applied to the rack shaft 12 in the axial direction. Thus, the rack shaft 12 moves in the axial direction with respect to the ball screw nut 31. This axial force applied to the rack shaft 12 serves as assist force to assist the driver in steering operation.

As depicted in FIG. 2, between the rack shaft 12 and the ball screw nut 31, a cylindrical retainer 50 is provided. The retainer 50 has a plurality of retainer grooves 51 that retain the balls 32 in a rollable manner. The retainer grooves 51 each have an elongated-hole shape that extends inclined at a certain angle with respect to the axis of the rack shaft 12. The retainer grooves 51 are formed at regular intervals in the circumferential direction of the retainer 50. The width of each separating portion 52 that separates adjacent retainer grooves 51 in the circumferential direction is sufficiently smaller than the diameter of the balls 32. Each retainer groove 51 forms a right angle with the thread groove 12a of the rack shaft 12 and with the thread groove 33 of the ball screw nut 31. In other words, each retainer groove 51 is formed so as to be inclined by the lead angle of the thread groove 12a and the thread groove 33 with respect to the axis of the rack shaft 12 and be square to the thread groove 12a and the thread groove 33.

Figure 3:
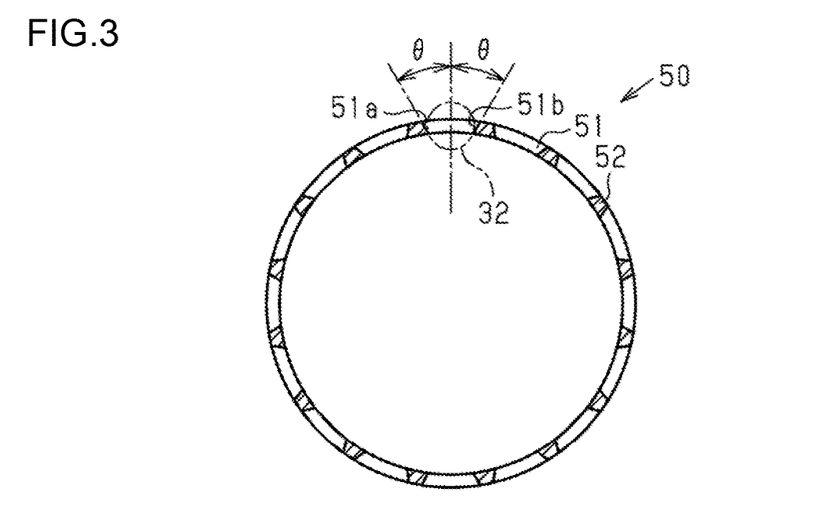
FIG. 3 is a sectional view of a retainer of the steering system according to the first embodiment when viewed from the axial direction.

As depicted in FIG. 3, on inner surfaces of each retainer groove 51 that face each other in the circumferential direction of the retainer 50, inclined surfaces 51a and 51b are formed. When viewed from the axial direction of the rack shaft 12, the inclined surfaces 51a and 51b are each inclined at a predetermined angle θ with respect to a straight line extending in a direction orthogonal to the axis of the retainer 50 such that these surfaces are separated toward the radial outside of the retainer 50. The angle θ of inclination of the inclined surfaces 51a and 51b is set such that the width of the retainer groove 51 in the circumferential direction is smaller than the diameter of the balls 32 in the inner periphery of the retainer 50 and is greater than the diameter of the balls 32 in the outer periphery of the retainer 50. By this setting, movement of the balls 32 toward the radial outside of the retainer grooves 51 is allowed, but movement thereof toward the radial inside of the retainer grooves 51 is restricted. The inclined surfaces 51a and 51b of the retainer grooves 51 are in contact with the balls 32, whereby movement of the retainer 50 in the radial direction is restricted. The retainer 50 is supported by the balls 32, whereby the retainer 50 is prevented from coming into contact with an outer peripheral surface of the rack shaft 12 and an inner peripheral surface of the ball screw nut 31 (see FIG. 2). Even when the rack shaft 12 is pulled out of the ball screw nut 31, the retainer 50 retains the balls 32 in the thread groove 33 of the ball screw nut 31.

The following describes the retainer 50 of the present embodiment. As indicated by continuous lines in FIG. 4, each retainer groove 51 has two short inner surfaces 53 that intersect the extending direction of the retainer groove 51 and two long inner surfaces 54 that intersect the short inner surfaces 53 and extend along the extending direction of the retainer groove 51. In each of four interior-angle portions where the two short inner surfaces 53 and the two long inner surfaces 54 intersect, a corner round surface 55 is formed. The radius of the corner round surface 55 is set to be smaller than one half of the width (length in the circumferential direction) of the retainer groove 51.

Figure 4:
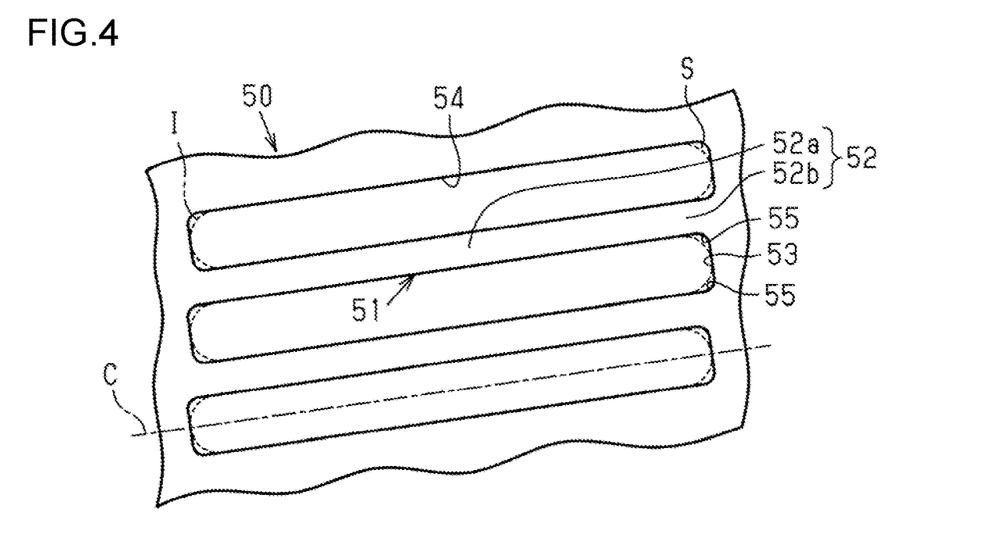
FIG. 4 is a schematic structural diagram of the retainer of the steering system according to the first embodiment when viewed from the radial direction.

In other words, in comparison with each retainer groove I both ends of which are indicated by long dashed double-short dashed lines and each form a circular-arc shape, both end portions of each retainer groove 51 of the present embodiment each have a shape that expands outward in a direction orthogonal to the extending direction of the retainer groove 51. When viewed from the radial direction (direction orthogonal to the axis of the retainer 50) of the retainer 50, the distance from a central line C along the extending direction of each retainer groove 51 to the long inner surface 54 of the corresponding central portion 52a in the retainer groove I is the same as that in the retainer groove 51. In contrast, the distance from the central line C to corner round surfaces 55 in the corresponding base portions 52b is partially longer in the retainer groove 51 of the present embodiment indicated by the continuous line than in the retainer groove I. The retainer groove 51 differs from the retainer groove I in that different portions S that are portions of difference between end portions of the retainer groove I and the corner round surfaces 55 are removed from the retainer groove I. It can be said that the retainer groove 51 has a shape of a rectangle having the corner round surfaces at its four corners.

The following describes functions and effects of the present embodiment. As a comparative example, a case of using the retainer groove I having both ends each forming a circular-arc shape will be described first. Because both end portions of the retainer groove 51 of the present embodiment in its extending direction each have a shape that extends more outward in a direction intersecting the extending direction of the retainer groove 51 than in the retainer groove I, the second moment of area of each base portion 52b when the retainer groove 51 is used is smaller than the second moment of area of the base portion 52b when the retainer groove I is used. In other words, in the retainer groove 51, the different portions S are removed from the retainer groove I, and accordingly the second moment of area of the base portion 52b decreases. Thus, the stiffness of the base portion 52b, the deflection stiffness thereof in particular, decreases, so that the difference between the deflection stiffness of the central portion 52a and the deflection stiffness of the base portion 52b decreases.

When the difference between the deflection stiffness of the central portion 52a of each separating portion 52 and the deflection stiffness of the base portions 52b thereof is large, some problems occur. For example, when the balls 32 are put into the thread groove 33 of the ball screw nut 31 from the inner periphery of the retainer 50 by bending the adjacent separating portions 52 in a state in which the retainer 50 is assembled to the inner periphery of the ball screw nut 31, insertion easiness when the balls 32 are inserted between the retainer 50 and the ball screw nut 31 varies with the position of each separating portion 52 in the axial direction. As the deflection stiffness of the separating portion 52 is lower, the separating portion 52 can be elastically deformed more easily when the balls 32 are inserted between the retainer 50 and the ball screw nut 31, which makes the insertion easier. When the deflection stiffness of the central portion 52a of each separating portion 52 is set to be suitable, it is easy to insert the balls 32 between the retainer 50 and the ball screw nut 31 in the central portion 52a of the separating portion 52, but it is difficult to insert the balls 32 between the retainer 50 and the ball screw nut 31 in the base portions 52b of the separating portion 52 because the deflection stiffness of the base portions 52b is higher than the deflection stiffness of the central portion 52a.

When the deflection stiffness of the base portion 52b is set to be suitable (low), the balls 32 can be easily inserted between the retainer 50 and the ball screw nut 31 also in the base portion 52b, but the balls 32 may fail to be properly retained in the central portion 52a the deflection stiffness of which is lower than that of the base portion 52b in a state in which the rack shaft 12 is pulled out of the ball screw nut 31. In order for the retainer 50 to properly retain the balls 32, the deflection stiffness of the separating portion 52 is preferably higher. Thus, in the shape of the conventional retainer groove I, when the deflection stiffness of the central portion 52a of the separating portion 52 is set to be suitable, it is difficult to insert the balls 32 in the base portion 52b because the deflection stiffness is higher in the base portion 52b of the separating portion 52. When the deflection stiffness of the base portion 52b is set to be suitable, the balls 32 may fail to be properly retained in the central portion 52a because the deflection stiffness is lower in the central portion 52a. If the central portions 52a (retainer 50) cannot properly retain the balls 32, the balls 32 may fall off the retainer 50. If the clearance between the balls 32 and the retainer grooves 51 is reduced so as to prevent the balls 32 from falling off, depending on dimensional variation in groove width, the balls 32 may roll together with the retainer 50 while being caught by the separating portions 52. This may increase the friction between the balls 32 and the retainer 50. Thus, it is preferable to reduce the difference between the deflection stiffness of the central portion 52a and the deflection stiffness of the base portion 52b, and to make the deflection stiffness more uniform over the respective portions of the retainer 50.

In the retainer 50 of the present embodiment, by reducing the deflection stiffness of the base portion 52b, the difference between the deflection stiffness of the central portion 52a and the deflection stiffness of the base portion 52b is reduced. This also reduces the difference between the cross-sectional area of the central portion 52a and the cross-sectional area of the base portion 52b. Thus, even when the deflection stiffness of the central portion 52a is set to be suitable, the balls 32 can be easily inserted even in the base portion 52b because the difference between the deflection stiffness of the base portion 52b and the deflection stiffness of the central portion 52a is small. Even when the deflection stiffness of the base portion 52b is set to be suitable, the balls 32 can be prevented from falling off the retainer 50 because the deflection stiffness of the central portion 52a is sufficiently obtained due to the small difference between the deflection stiffness of the base portion 52b and the deflection stiffness of the central portion 52a.

The following describes a steering system using a ball screw device according to a second embodiment. Herein, differences from the first embodiment are mainly described.

Figure 5:
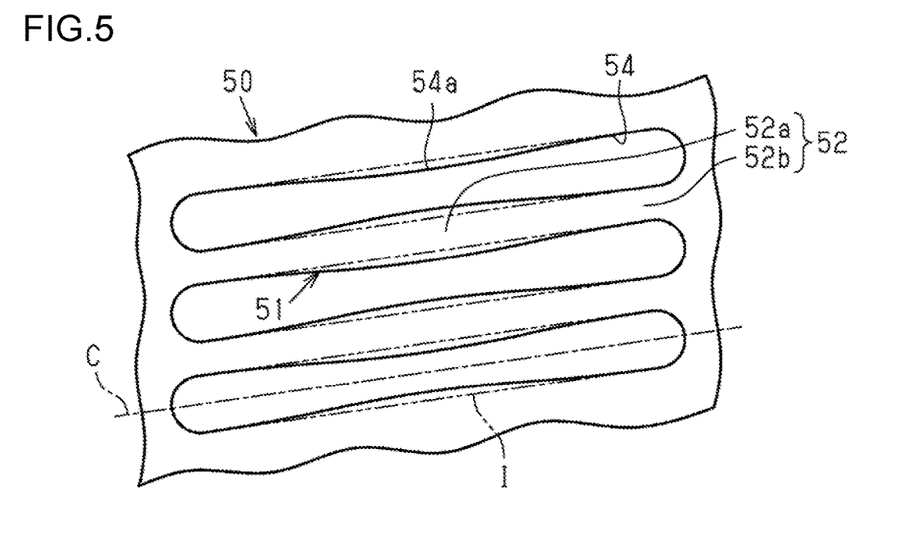
FIG. 5 is a schematic structural diagram of a retainer of a steering system according to a second embodiment when viewed from the radial direction.

As depicted in FIG. 5 in which the shape is exaggerated, both ends of each retainer groove 51 of the present embodiment each have a circular-arc surface shape similarly to those of each retainer groove I of the comparative example. The central portion 52a of each separating portion 52 in the axial direction has a length longer (width greater) in the circumferential direction (direction orthogonal to the extending direction of the retainer groove 51) than that of the base portions 52b. In other words, an intermediate wide portion 54a is formed on each long inner surface 54 of the retainer groove 51, and thus the central portion 52a of the separating portion 52 is wider than the base portions 52b.

Thus, in the axial direction of the rack shaft 12, a portion of the retainer groove 51 corresponding to the central portion 52a is narrower than a portion of retainer groove 51 corresponding to each base portion 52b. In the retainer groove 51 of the present embodiment, the length of the central portion 52a of the separating portion 52 in the circumferential direction is longer than that in the retainer groove I.

The second moment of area of the separating portion 52 is greater at a position closer to the central portion 52a in the extending direction of the retainer groove 51. In other words, the second moment of area of the central portion 52a is greater than the second moment of area of the base portion 52b. Thus, the disadvantage that the deflection stiffness of the central portion 52a is small in the shape of the conventional retainer groove I can be expected to be compensated with the increased deflection stiffness of the central portion 52a, which reduces the difference between the deflection stiffness of the central portion 52a and the deflection stiffness of the base portion 52b. Consequently, the deflection stiffness of the central portion 52a and the deflection stiffness of the base portion 52b are made more uniform.

The following describes a steering system using a ball screw device according to a third embodiment. Herein, differences from the first embodiment are mainly described.

Figure 6:
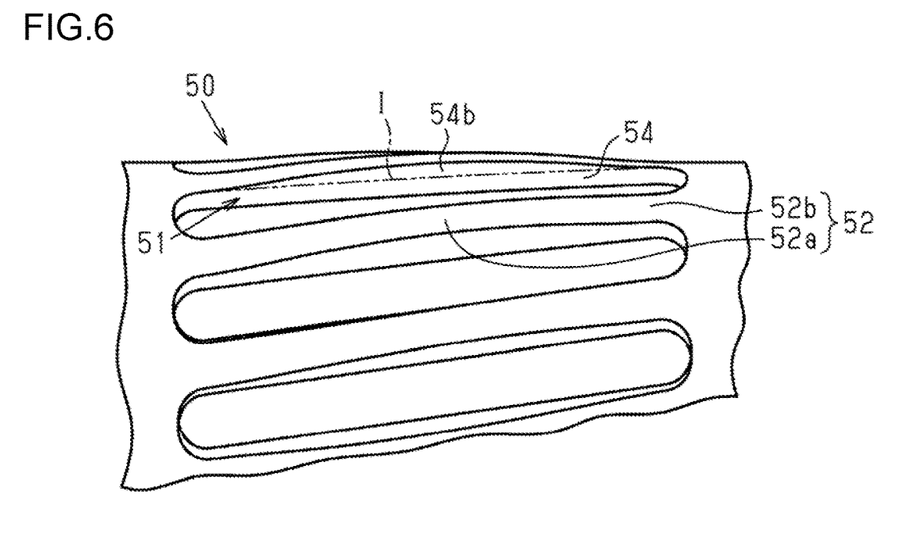
FIG. 6 is a schematic structural diagram illustrating the thickness of a retainer of a steering system according to a third embodiment.

As depicted in FIG. 6, both ends of each retainer groove 51 of the present embodiment each have a circular-arc surface shape similarly to those of each retainer groove I of the comparative example. The central portion 52a of each separating portion 52 has a length longer than that of the base portions 52b in the radial direction of the retainer 50 (thickness direction of the separating portion 52). The central portion 52a expands radially outward with respect to the outer peripheral surfaces of the base portions 52b. In other words, a thick portion 54b is formed on the outer peripheral surface of the separating portion 52, and thus the central portion 52a is thicker than the base portions 52b. The thickness of the central portion 52a is preferably set to such an expanding thickness that the central portion 52a does not come into contact with the ball screw nut 31.

The second moment of area of the separating portion 52 is greater at a position closer to the central portion 52a in the extending direction of the retainer groove 51. In other words, the second moment of area of the central portion 52a is greater than the second moment of area of the base portion 52b. Thus, the disadvantage that the deflection stiffness of the central portion 52a is small in the shape of the conventional retainer groove I can be expected to be compensated with the increased deflection stiffness of the central portion 52a, which reduces the difference between the deflection stiffness of the central portion 52a and the deflection stiffness of the base portion 52b.

The following describes a steering system using a ball screw device according to a fourth embodiment. Herein, differences from the first embodiment are mainly described.

Figure 7:
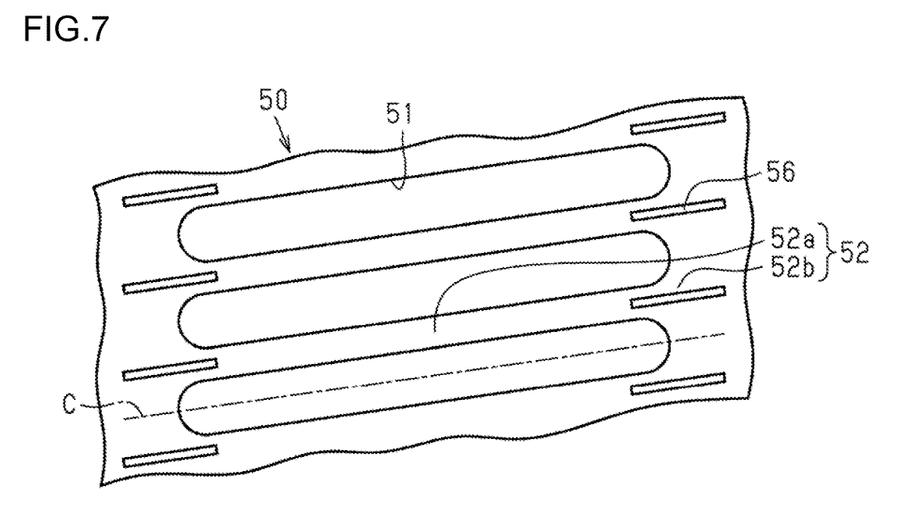
FIG. 7 is a schematic structural diagram of a retainer of a steering system according to a fourth embodiment when viewed from the radial direction.

As depicted in FIG. 7, both ends of each retainer groove 51 of the present embodiment each have a circular-arc surface shape similarly to those of each retainer groove I of the comparative example. On the outer peripheral surface of the retainer 50, a plurality of grooves 56 are formed. The grooves 56 are each formed in two base portions 52b positioned on both sides of the central portion 52a of each separating portion 52. The grooves 56 are formed parallel to the extending direction of the retainer groove 51.

The second moment of area of each of the base portions 52b of the separating portion 52 is smaller than the second moment of area of the central portion 52a because the grooves 56 are formed. This is because a portion that is removed by forming each groove 56 stops contributing to the second moment of area. Thus, the deflection stiffness of the base portion 52b can be expected to decrease, which reduces the difference between the deflection stiffness of the central portion 52a and the deflection stiffness of the base portion 52b.

Figure 8:
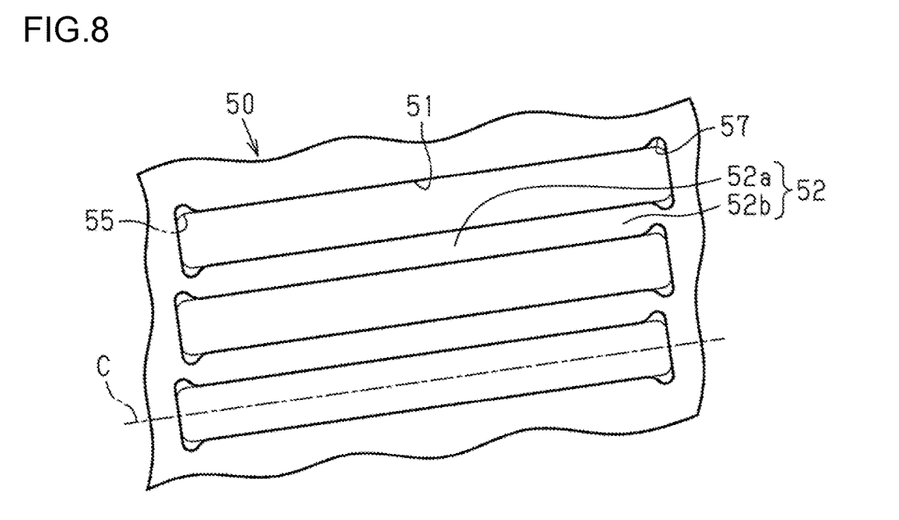
FIG. 8 is a schematic structural diagram of a retainer of a steering system according to another embodiment when viewed from the radial direction.

The respective embodiments may be modified as follows. Other embodiments below and the respective embodiments may be combined with each other unless a technical contradiction arises. In the first embodiment, the corner round surfaces 55 of each retainer groove 51 are formed in interior-angle portions where the short inner surfaces 53 and the long inner surfaces 54 intersect, but the present invention is not limited to this. For example, as depicted in FIG. 8, recessed portions 57 may be formed that extend outward in the circumferential direction of the retainer 50 more than the corner round surfaces 55. In this case also, by shortening the length of each base portion 52b in the circumferential direction, the deflection stiffness of the base portion 52b can be further reduced.

In the second embodiment, the length of the central portion 52a of each separating portion 52 in the circumferential direction is set to be longer than the length of the base portions 52b in the circumferential direction. In the third embodiment, the length (thickness) of the central portion 52a in the radial direction is set to be longer than the length of the base portions 52b in the radial direction. However, the length of the central portion 52a in the circumferential direction and the length thereof in the radial direction both may be set to be longer than the length of the base portions 52b in the circumferential direction and the length thereof in the radial direction, respectively. In other words, at least one of the length of the central portion 52a in the circumferential direction and the length thereof in the radial direction only needs to be set to be longer than the length of the base portions 52b in the circumferential direction and the length thereof in the radial direction, respectively.

In the fourth embodiment, the grooves 56 are each provided in two base portions 52b positioned on both sides of the central portion 52a of each separating portion 52. However, the groove may be formed in only either one of the base portions 52b. The grooves 56 may be formed in any portions other than the central portion 52a of each separating portion 52, on the peripheral surface of the retainer 50. In other words, the grooves may be formed in any portions if the grooves can reduce the difference between the deflection stiffness of the central portion 52a and the deflection stiffness of each base portion 52b (if the deflection stiffness can be made uniform over the respective portions). For example, the grooves 56 may be formed on the inner peripheral surface of the retainer groove 51. In this case, although no groove 56 is formed in the central portion 52a or a small groove 56 is formed in the central portion 52a, larger grooves are formed in the base portions 52b, whereby the deflection stiffness of each base portion 52b is reduced with respect to the deflection stiffness of the central portion 52a.

In the third embodiment, the central portion 52a expands radially outward with respect to the outer peripheral surfaces of the base portions 52b, but the present invention is not limited to this. For example, the central portion 52a may expand radially inward with respect to the inner peripheral surfaces of the base portions 52b.

In the first embodiment, the short inner surfaces 53 of each retainer groove 51 are each formed in a planar shape, but may be each formed in a curved surface shape instead of the planar shape if the deflection stiffness of each base portion 52b can be reduced.

In the respective embodiments, the present invention is embodied in the EPS 1 that is configured to apply the assist force to the rack shaft 12 by the motor 20 having the rotary shaft 21 disposed parallel to the rack shaft 12, but the present invention is not limited to this. For example, the present invention may be embodied in another type of steering system including the ball screw device 30 that converts the rotational motion of the motor 20 into a linear motion of the rack shaft 12 in the axial direction. The electric power steering system that uses the rotational force of the motor 20 to assist the linear motion of the rack shaft 12 in conjunction with steering operation has been exemplified. However, the present invention may be applied to a steer-by-wire (SBW) steering system of a type having no mechanical coupling to the steering wheel. When being embodied in an SBW steering system, the present invention may be embodied not only as a front-wheel steering system, but also as a rear-wheel steering system or a four-wheel steering system (4WS). In other words, the front-wheel steering system, the rear-wheel steering system, or the four-wheel steering system only needs to include the ball screw device 30 that converts a rotational motion applied thereto into a linear motion.

In the respective embodiments, the present invention has been embodied in the EPS 1 including the ball screw device 30, but the present invention is not limited to this. For example, the ball screw device 30 may be embodied in a machine tool, or the present invention may be embodied in a machine including a movable unit that rotates a ball screw nut thereby linearly moving a ball screw shaft.

What is claimed is:

1. A ball screw device comprising:
a ball screw shaft having an outer peripheral surface on which a ball rolling groove is spirally formed;
a ball screw nut having an inner peripheral surface on which a ball rolling groove is spirally formed;
a plurality of balls provided between the ball rolling groove of the ball screw shaft and the ball rolling groove of the ball screw nut; and
a retainer disposed between the ball screw shaft and the ball screw nut and having a cylindrical shape in which a plurality of retainer grooves that retain the balls in a rollable manner and a plurality of separating portions each of which is a portion between the retainer grooves adjacent to each other in a circumferential direction and separates the balls from each other in the circumferential direction, wherein
the retainer has
a structure in which a central portion positioned between both base portions that are both end portions of each separating portion in the extending direction of the retainer groove has a length longer in at least one of a radial direction and a circumferential direction of the retainer than a length of the base portions, and
a thickness of the central portion in the radial direction of the retainer is set to be greater than a thickness of the base portions in the radial direction of the retainer.

2. The ball screw device according to claim 1, wherein when viewed from a direction orthogonal to an axis of the retainer,
a distance from a central line that extends along the extending direction of each retainer groove to an inner surface of an edge of the separating portion defining the respective retainer groove is shorter in the central portion than in the base portions.

3. The ball screw device according to claim 1, wherein each separating portion has has two short inner surfaces defining the respective retainer groove that face each other in the extending direction of the retainer groove and two long inner surfaces that intersect the two short inner surfaces and extend along the extending direction of the retainer groove, and
in each of four interior-angle portions where the two short inner surfaces and the two long inner surfaces intersect, a corner round surface is formed that has a radius smaller than one half of a width of the retainer groove in a direction intersecting the extending direction of the retainer groove.

4. The ball screw device according to claim 1, wherein a width of the base portions in a direction intersecting the extending direction of each retainer groove is smaller than a width of the central portion in the direction intersecting the extending direction of the retainer groove.

5. A steering system comprising:
the ball screw device as claimed in claim 1.

6. A ball screw device comprising:
a ball screw shaft having an outer peripheral surface on which a ball rolling groove is spirally formed;
a ball screw nut having an inner peripheral surface on which a ball rolling groove is spirally formed;
a plurality of balls provided between the ball rolling groove of the ball screw shaft and the ball rolling groove of the ball screw nut; and
a retainer disposed between the ball screw shaft and the ball screw nut and having a cylindrical shape in which a plurality of retainer grooves that retain the balls in a rollable manner and a plurality of separating portions each of which is a portion between the retainer grooves adjacent to each other in a circumferential direction and separates the balls from each other in the circumferential direction, wherein
the retainer includes a central portion positioned between both base portions that are both end portions of each separating portion in the extending direction of the retainer groove,
the retainer has a structure in which a groove is formed on an outer peripheral surface of each base portion.

\* \* \* \* \*